United States Patent
Peterson

(10) Patent No.: US 9,341,230 B2
(45) Date of Patent: May 17, 2016

(54) TUNNEL-STYLE CRANKSHAFT WITH COUNTERWEIGHTS OF INCREASED RADIAL PROFILE

(71) Applicant: GARDNER DENVER PETROLEUM PUMPS, LLC, Tulsa, OK (US)

(72) Inventor: Scott D. Peterson, Tyrone, PA (US)

(73) Assignee: GARDNER DENVER PETROLEUM PUMPS, LLC, Tulsa, OK (US)

( * ) Notice: Subject to any disclaimer, the term of this patent is extended or adjusted under 35 U.S.C. 154(b) by 117 days.

(21) Appl. No.: 14/227,906

(22) Filed: Mar. 27, 2014

(65) Prior Publication Data

US 2015/0276015 A1    Oct. 1, 2015

(51) Int. Cl.

| F16C 3/06 | (2006.01) |
|---|---|
| F16F 15/26 | (2006.01) |
| F16C 3/20 | (2006.01) |
| F16C 3/12 | (2006.01) |
| F16C 9/02 | (2006.01) |
| F16C 19/26 | (2006.01) |

(52) U.S. Cl.
CPC . *F16F 15/26* (2013.01); *F16C 3/06* (2013.01); *F16C 3/12* (2013.01); *F16C 3/20* (2013.01); *F16C 9/02* (2013.01); *F16C 19/26* (2013.01); *Y10T 74/2183* (2015.01)

(58) Field of Classification Search
CPC .............. F16C 3/06; F16C 3/08; F16C 3/10; F16C 3/12; F16C 3/20; F16C 9/02; F02B 33/02; F02B 33/18; A61F 15/26; A61F 15/283; Y10T 74/2174; Y10T 74/2177; Y10T 74/2183
See application file for complete search history.

(56) References Cited

U.S. PATENT DOCUMENTS 2,227,942 A * 1/1941 Martin ...................... F16D 3/12
                                                                74/604
2,393,029 A    1/1946 Eberhard

FOREIGN PATENT DOCUMENTS

GB            189753 A *  11/1923  ................ F16C 3/12
WO    WO 2004/042244 A1    5/2004

* cited by examiner

*Primary Examiner* — Thomas Diaz
(74) *Attorney, Agent, or Firm* — Michael Best & Friedrich LLP

(57) ABSTRACT

A tunnel-style crankshaft assembly is provided having counterweights that serve the purposes of retaining the axial motion of bearings and improving the balance of the crankshaft assembly as a result of having a structure of an increased radial profile. The counterweights can include a mass section and a bearing retaining section. When the counterweight is secured to a crank web, the mass section of the counterweight is axially spaced from a bearing assembly disposed around the web. Therefore, the mass section of the counterweight may extend radially beyond an inner race of the bearing assembly without contacting the bearing assembly's cage. The mass section of the counterweight does not extend radially beyond a radial envelope of a crankshaft support surface thereby permitting the crankshaft assembly to be slidingly inserted into the crankcase.

20 Claims, 5 Drawing Sheets

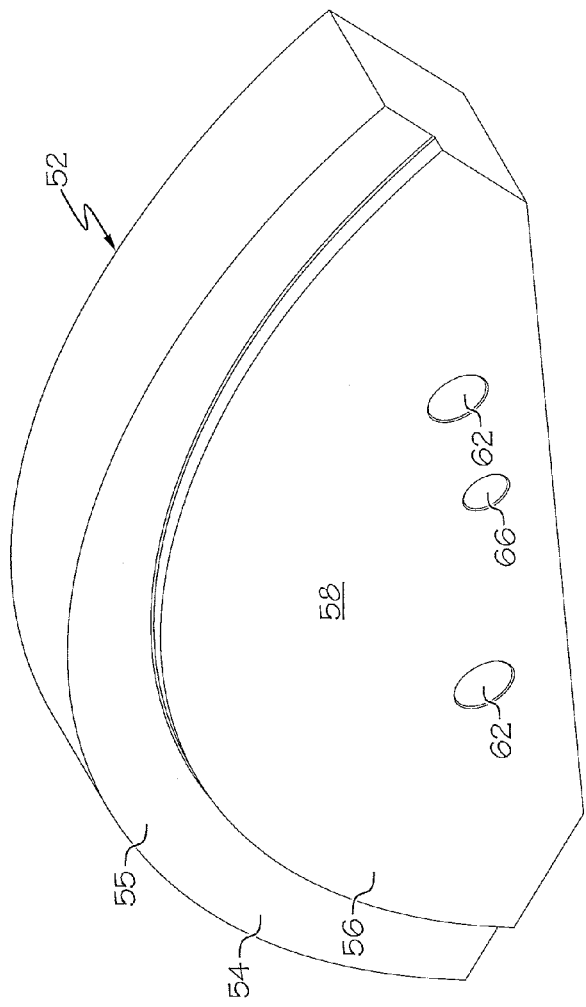
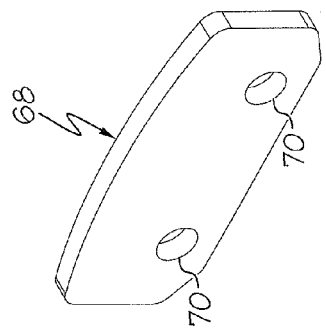
FIG. 7
FIG. 6

TUNNEL-STYLE CRANKSHAFT WITH COUNTERWEIGHTS OF INCREASED RADIAL PROFILE

CROSS-REFERENCE TO RELATED APPLICATIONS

None.

BACKGROUND OF THE INVENTION

Crankshafts are used in engines, pumps, compressors, and other mechanical devices for converting reciprocating linear motion into rotational motion, or vice versa. When used in connection with internal combustion engines, crankshafts convert reciprocating linear motion into rotational motion. When used in connection with pumps, crankshafts typically convert rotational motion into reciprocating linear motion.

Tunnel-style crankshafts are a type of crankshaft that are regularly used in reciprocating pumps. These crankshafts include enlarged cheeks or webs for supporting bearings therearound. The webs form the largest diameter of the crankshaft. Main bearings are typically retained in place on the webs with a plurality of retaining elements so as to prohibit or limit any axial movement of the bearing. Tunnel-style crankshafts can be inserted into one-piece, non-split crankcases, as opposed to two-piece, split crankcases as are typically required with most automotive internal combustion engines.

Forces generated by reciprocating pistons or plungers and changes in crank angle can both produce unbalanced shaking moments and unbalanced shaking forces in the pumps. Counterweights are commonly attached to crankshafts in an effort to dynamically balance the crankshafts in order to reduce these undesirable inertial shaking moments and/or forces.

SUMMARY OF THE INVENTION

One embodiment of the present invention involves the provision of a tunnel-style crankshaft assembly comprising axially-spaced webs, crank pins extending between and interconnecting the webs, a main bearing assembly forming at least a portion of a main bearing disposed around the webs and carried by the webs, and counterweights adapted for retaining the main bearing assembly in an axial direction and adapted to provide balance. The bearing assemblies carried by the webs include an inner race and rolling elements carried on the inner race and a cage in which the roller elements are disposed. Generally the main bearing of a respective web includes an outer race which bounds the roller elements at a radial end of the roller elements opposite the inner race. Intermediate bearing assemblies carried on intermediate webs, which are between end webs, do not carry an outer race at a time the crankshaft assembly is to begin being inserted into a crankcase. Also the bearing assembly on an end web first inserted into the crankcase when the crankshaft has begun being inserted into the crankcase does not carry an outer race. The outer race for the intermediate webs is generally carried in and supported by the crankcase before the crankshaft is inserted into the crankcase. It is engaged with and carried within a crankshaft support surface formed in the crankcase. It is possible the bearing assembly carried on a web at an end of the crankshaft last inserted into the crankcase can carry an outer race at the time the crankshaft begins being inserted into the crankcase. It is possible the rollers are disposed within the outer race of the bearing, in which case the radial envelope of the crankcase would be smaller than if the rollers were disposed around the inner race. The inner race of each bearing is sized to fit around an outer bearing support surface of a respective web and the outer race of each bearing is sized to be within an envelope defined by the crankshaft support surface of the crankcase into which the crankshaft may be slidingly inserted.

The counterweights serve the purposes of retaining the axial motion of the main bearing assemblies carried by the webs and improving the balance of the crankshaft assembly as a result of having a structure defining an increased radial profile. The counterweights each include a mass section and a bearing retaining section. The bearing retaining section may be a projection extending axially away from a surface of the mass section. In one embodiment, the bearing retaining section of the counterweight does not extend radially beyond the outer most diameter of the bearing inner race. It does overlap and abut the inner race. It does extend radially beyond the outer bearing support surface of the web. It does not extend radially far enough to contact the cage or any other part of the bearing assembly with which there is relative movement between the web and the bearing assembly when the crankshaft is in motion. The mass section of the counterweight may have a surface facing the web with the surface facing the web spaced axially from the web thereby allowing the mass section of the counterweight to extend radially beyond the bearing support surface without contacting the bearing inner race, cage, or roller elements. The mass section can, however, overlap the inner race and roller element and cage. It may extend radially beyond the outermost diameter of the inner race. In other words, the mass section of the counterweight can define a radial profile that is greater in diameter than a radial profile defined by the bearing inner race. In one embodiment, the mass section of the counterweight does not extend radially beyond the radial envelope of the crankshaft support surface. This permits the crankshaft assembly to be slidingly inserted into a single-piece crankcase.

Other and further objects of the invention, together with the features of novelty appurtenant thereto, will appear in the course of the following description. When an element is described to overlap another element, the term overlap does not necessarily mean that the other element is completely overlapped.

DESCRIPTION OF THE SEVERAL VIEWS OF THE DRAWING

The accompanying drawings form a part of the specification. Like reference numerals are used to indicate like or similar parts in the various views:

FIG. 6 is a side perspective view of a bearing retainer in accordance with one embodiment of the present invention; and FIG. 7 is a side perspective view of a counterweight in accordance with one embodiment of the present invention.

DETAILED DESCRIPTION OF THE INVENTION

Figure 1:
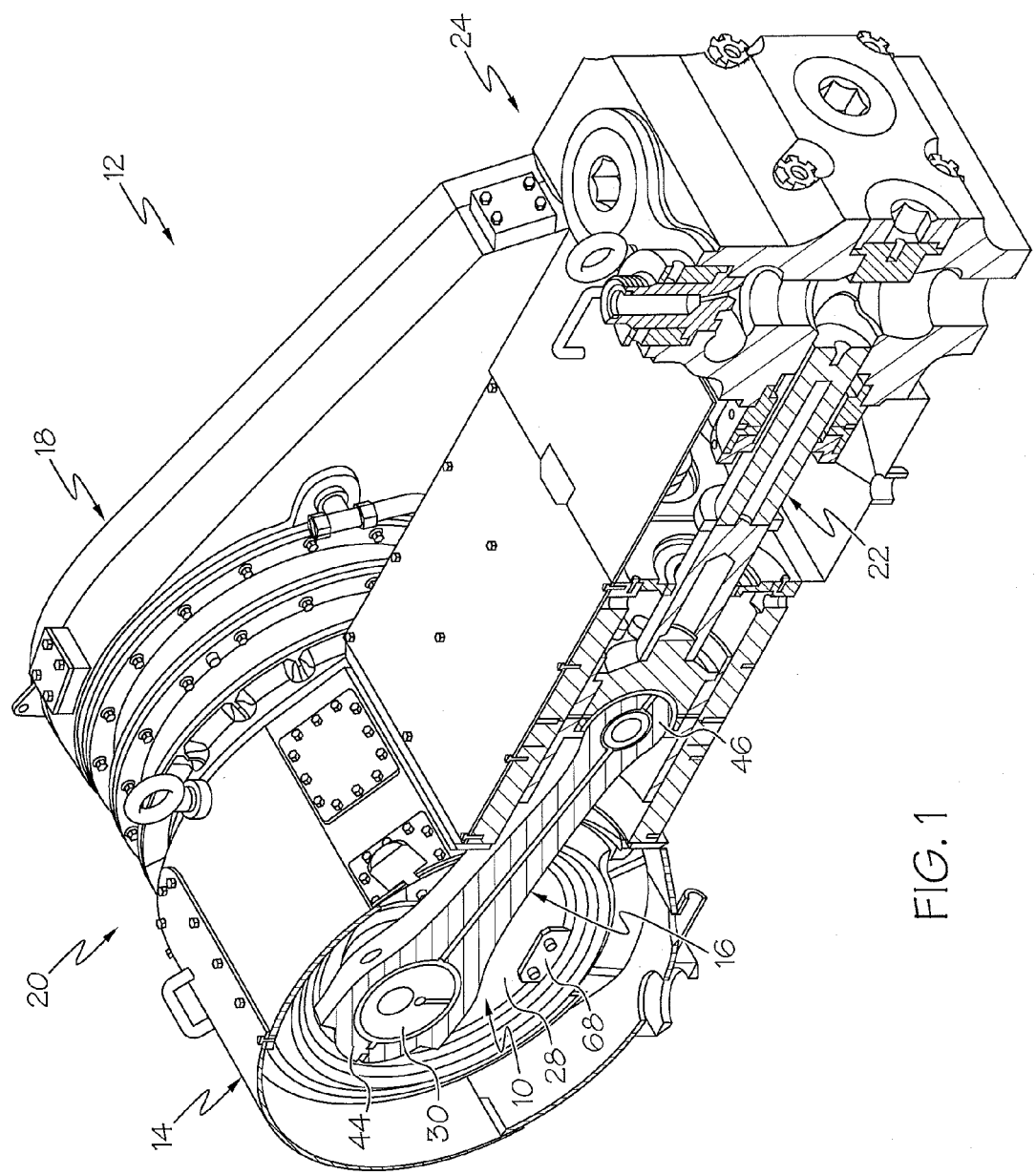
FIG. 1 is a partial cutaway side perspective view of a pump incorporating a crankshaft assembly in accordance with one embodiment of the present invention.

An embodiment of the invention is disclosed with reference to the drawing figures, in which like reference numerals refer to like parts throughout. For purposes of clarity in illustrating the characteristics of the present invention, proportional relationships of the elements have not necessarily been maintained in the drawing figures.

The following detailed description references specific embodiments. The embodiments are intended to describe aspects of the invention in sufficient detail to enable those skilled in the art to practice the best mode of the invention. Other embodiments can be utilized and changes can be made without departing from the scope of the present invention. The present invention is defined by the appended claims. The description is, therefore, not to be taken in a limiting sense and shall not limit the scope of equivalents to which such claims are entitled.

The present invention is directed generally to a tunnel-style crankshaft assembly 10 adapted for use with a reciprocating pump 12, internal combustion engine, compressor or other mechanical device. FIG. 1 illustrates a reciprocating plunger pump 12 having a tunnel crankcase 14 with the crankshaft assembly 10 of the present invention installed therein. When used in this manner, the crankshaft assembly 10 is adapted for connection with one or more connecting rods 16 in order to convert the rotational motion of a gear box 18 at a power end 20 of the pump 12 into reciprocating linear motion to drive a plunger 22 at a fluid end 24 of the pump 12.

The crankshaft assembly 10 of the present invention is particularly well suited for use with pumps and engines having a plurality of cylinders, pistons or plungers 22 arranged in a row. It will be understood that the crankshaft assembly 10 can be employed in connection with a variety of reciprocating pumps, including but not limited to plunger pumps 12, piston pumps, radial piston pumps, diaphragm pumps, and any other pumps wherein rotational motion is translated to reciprocating linear motion. Such pumps may be used in a number of applications including crude or fluid transfer, chemical injection, well servicing, water-jet cutting and pressurized hydraulic fracking, among others. It will further be understood that the crankshaft assembly 10 can be employed in connection with internal combustion engines, particularly those adapted for running long periods of time at generally constant speeds and used in applications such as generator sets, locomotives, boats and pumps, among others.

Figure 2:
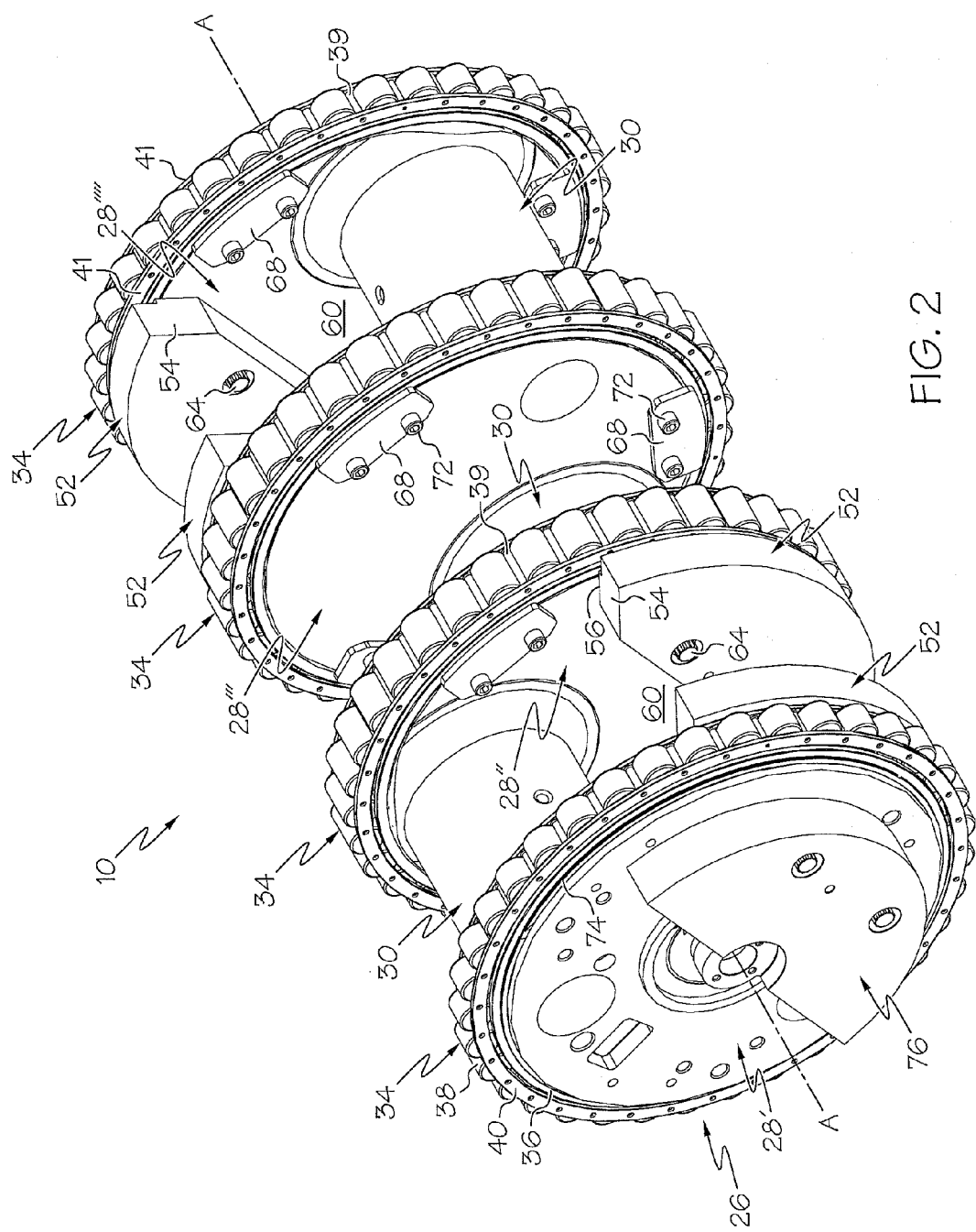
FIG. 2 is a side perspective view of a crankshaft assembly in accordance with one embodiment of the present invention having the outer races of the bearings removed therefrom.
Figure 3:
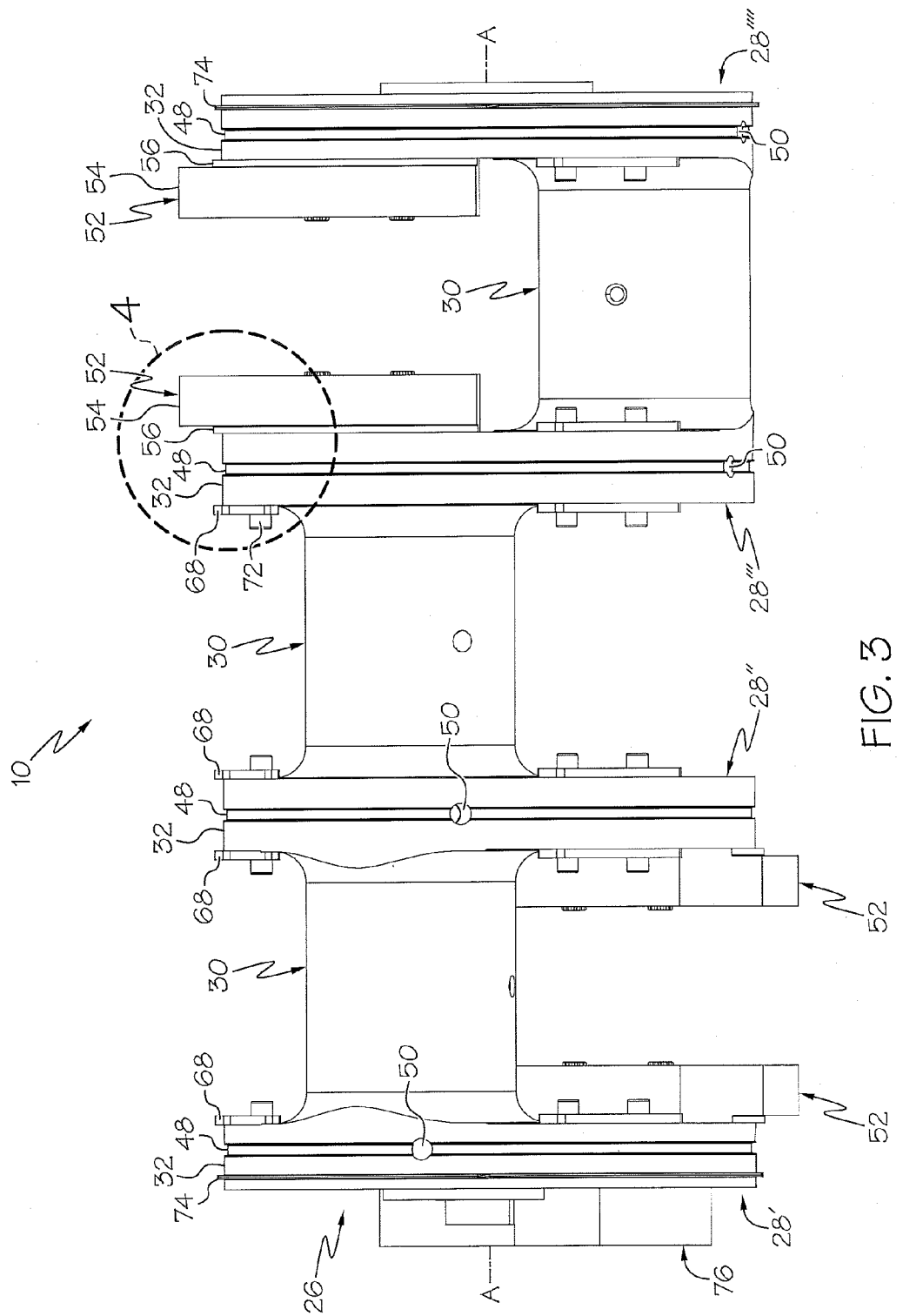
FIG. 3 is a schematic side view of the crankshaft assembly of FIG. 2 having the bearings removed therefrom.

As depicted in FIGS. 2 and 3, the crankshaft assembly 10 includes a crankshaft 26 comprising a plurality of axially-spaced cylindrical crank cheeks or webs 28 in the form of discs connected together by eccentric, integral crank pins 30, which may be hollow. The webs 28 may be provided with outer bearing support surfaces 32. The surfaces are cylindrical and circumferential. They are of uniform diameter and are arranged about and along an axis A-A. Each crank pin 30 extends between and interconnects two adjacent webs 28. As demonstrated in FIG. 1, each crank pin 30 can be coupled to a respective connecting rod 16. More particularly the first end 44 of a respective connecting rod 16 is journaled to a respective crank pin 30. The second end 46 of each connecting rod 16 can be coupled, either directly or indirectly, with a respective piston, plunger 22, diaphragm or other reciprocating pumping member. The crankshaft 26 is a tunnel- or roller bearing-style crankshaft, meaning it has bearing-supporting webs 28 which form the largest diameter of the crankshaft 26.

As will be described in greater detail below, at least one of the main bearing assemblies 34, which form at least part of main bearings 35, disposed around the webs 28, forms the largest diameter of the crankshaft assembly 10 at the time the assembly is initially being inserted into the crankcase. While the crankshaft 26 shown in FIGS. 2 and 3 has four webs 28 and three crank pins 30, it will be appreciated that other numbers of webs 28 and crank pins 30 are also well within the scope of the present invention. The crankshaft 26 may be forged, cast or machined out of a billet.

Figures 4, 5:
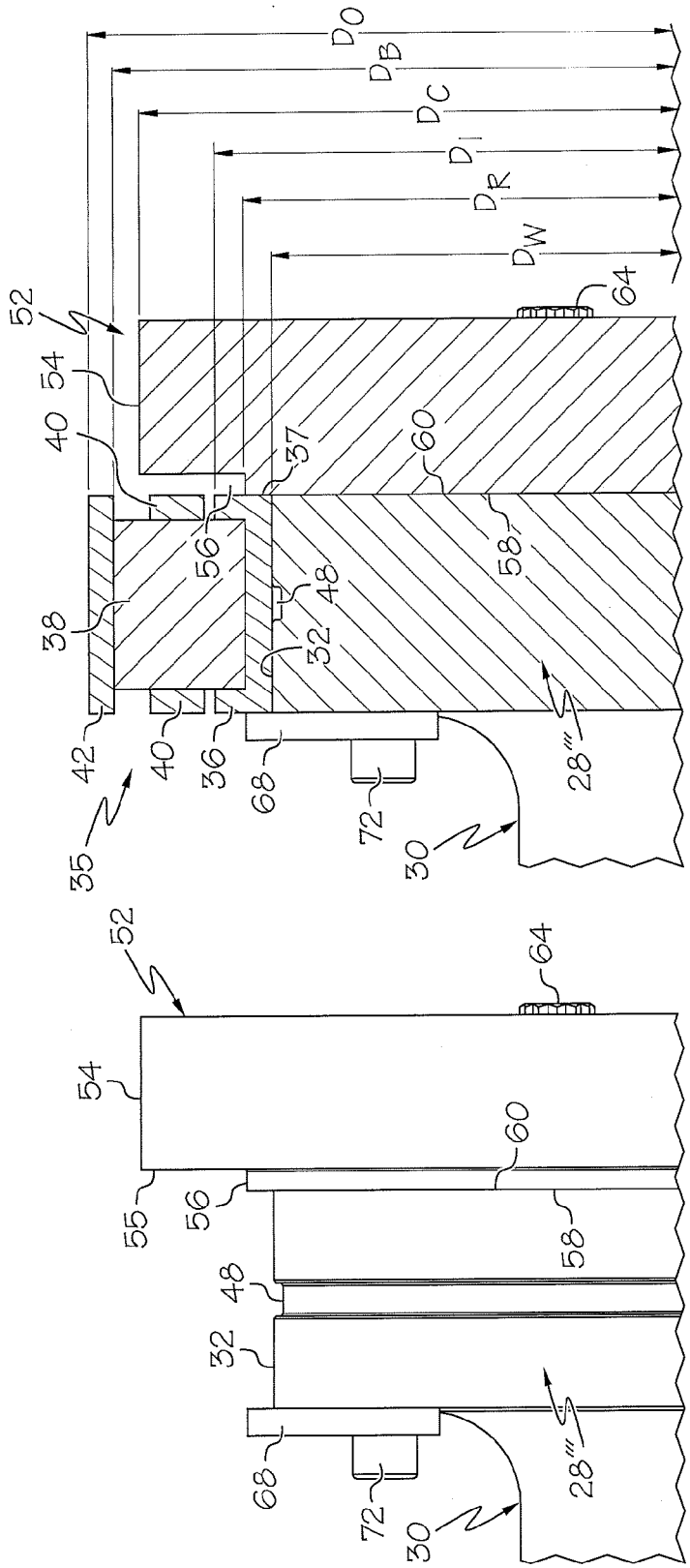
FIG. 4 is an enlarged side view of the portion of the crankshaft assembly labeled as 4 of FIG. 3.
FIG. 5 is an enlarged partial sectional view of the crankshaft assembly of FIG. 2 illustrating a bearing assembled therewith which includes an outer race of the bearing, said outer race is not part of the crankshaft assembly shown in FIG. 2.

As illustrated in FIGS. 2 and 5, a main bearing assembly 34 which forms at least part of a main bearing 35 is disposed around the outer bearing support surface 32 of each web 28. The main bearing assemblies 34 are disposed around their respective webs 28 prior to insertion of the crankshaft 26 in the crankcase 14. Thus it is the crank shaft assembly 10 in the shown embodiment that is inserted into the crankcase 14. Each bearing assembly 34 which is a partial assembly of a bearing 35, and which can alternatively be called an assembly of a bearing 35, comprises an inner race 36, rolling elements 38, and a cage 40. An outer race 42 may be disposed around the bearing assembly 34, on an end web 28' last inserted into the crankcase 14, prior to the crankshaft being inserted into the crankcase 14. The outer race 42, which forms part of the main bearing 35, is usually not carried by the crankshaft 26 intermediate webs 28" or 28'" or the web 28"" first inserted into the crankcase at the time the crankshaft 26 is to begin being inserted in the crankcase 14. For the intermediate webs 28" & 28'", the outer race is carried in the crankcase 14 and supported by the crankcase 14 before the crankshaft is inserted into the crankcase 14. Each main bearing assembly 34 is sized so as to be disposed between the bearing support surface 32 of a respective web 28 and the crankshaft support surface engaged with a respective outer race 42. Accordingly, the inner diameter of the inner race 36 is sized to fit around the bearing surface 32 of a web 28, and the outer diameter of the outer race 42 (see FIG. 5) is sized so as to be received within its respective outer race support surface and to surround its respective roller elements 38. Each outer race support surface is cylindrical.

The roller elements 38 of each bearing assembly are between a pair of circumferentially extending and axially spaced brackets. Rods extend axially between each bracket. The rods 39 and brackets 41 form cage 40. The cage 40 stabilizes the rollers 38 in the circumferential and axial directions. The races 36 & 42 provide a runway for the rollers 38. The roller elements 38 may be rollers, balls or other suitable rolling elements.

Each web 28 may include one or more circumferential grooves 48 defined in its peripheral bearing surface 32 adapted for distributing lubrication from ports 50 to the roller elements 38. The crankshaft assembly 10 is adapted to be axially inserted into a non-split crankcase, as opposed to a split crankcase as is typical with many internal combustion engines.

The crankshaft assembly 10 may include one or more bearing retainers 68 for retaining the main bearing assemblies 34 in an axial direction on the web bearing surfaces 32. At least a portion of each bearing retainer 68 extends radially beyond the bearing surface 32 of the web 28 to which it is attached. As such, the bearing retainers 68 are adapted for engaging and abutting the inner races 36 of the main bearing assemblies 34, which rotate with (and therefore remain static relative to) the webs 28, in order to prevent the main bearing assemblies 34 from sliding off of the webs 28. The outer race 42 is in fixed engagement relative to the crankcase 14. Each web 28, when in rotational operation, moves relative to its respective roller elements 38, cage 40, and outer race 42. In one embodiment, the bearing retainers 68 do not extend radially beyond the outer most diameter $D_I$ of inner races 36. The retainers extend radially to overlap the inner race 36. The bearing retainers 68 can include one or more apertures 70 defined therethrough through which fasteners 72 may extend for securing the bearing retainers 68 to the webs 28. In one embodiment, at least one side of one web 28 includes three bearing retainers 68 attached thereto, wherein the bearing retainers 68 are circumferentially-spaced apart at approximately 120°. As an alternative to the bearing retainers 68, one or more of the webs 28 of the crankshaft 26 may each include a circumferential groove (not shown) defined therein for receiving a removable snap ring 74 adapted for retaining a main bearing assembly 34 in an axial direction.

The crankshaft assembly 10 of the present invention includes counterweights 52 that, in addition to providing mass for balance, also serve to retain the main bearing assemblies 34 in an axial direction on the web bearing surfaces 32. As such, the counterweights 52 consolidate the need for two parts into a single part. Further, as discussed in greater detail below, the configuration of the counterweights 52 allows the counterweights 52 to be radially extended; thereby increasing the effectiveness the mass of the counterweights 52 has on balancing the crankshaft assembly 10.

As shown in FIGS. 2-5 and 7, the counterweights 52 include a mass section 54 and a bearing retaining section 56. The bearing retaining section 56 can be a projection extending axially away from a surface 55 of said mass section 54 and may include a surface 58 that is adapted for mating with and abutting a surface 60 of a web 28 and for mating with and abutting a surface 37 of the inner race 36. The counterweights 52 may be constructed of cast steel or other suitable material or combination of materials and may also be machined. The portion of counterweight 52 which axially projects is the retaining section 56. It projects axially away from surface 55 of the mass section 54 facing towards surface 60 of the web 28 to which the weight is coupled. The projection of section 56 forms a step with the surface 55. While the counterweights 52 illustrated in the figures are of unitary construction, it will be appreciated that the counterweights 52 may comprise multiple components or sections that are secured together during the assembly process. In one embodiment, metal or lead slugs (not shown) are inserted into the counterweights 52. In another embodiment, the counterweights 52 may have material removed therefrom in order to achieve a particular weight or balance.

In one embodiment, the counterweights 52 include one or more apertures 62 defined therethrough through which fasteners 64 may extend for securing the counterweights 52 to the webs 28. The counterweights 52 can also have one or more apertures 66 defined therethrough through which alignment dowel pins or alignment rods (not shown) may extend in order to facilitate the positioning of the counterweights 52 with respect to the webs 28 during their assembly with the crankshaft 26. However, it will be understood that the counterweights 52 may be attached or secured to the webs 28 by other means or may be forged, cast, machined or welded in place.

As best depicted in FIG. 5, at least a portion of the bearing retaining section 56 extends radially beyond the bearing surface 32 of the web 28. In one embodiment, the bearing retaining section 56 has an effective diameter $D_R$, which can also be called a length, that is greater than the diameter $D_W$, which can also be called a length, of the bearing support surface 32 of the web 28 to which it is attached. As such, the bearing retaining section 56 of each counterweight 52 is adapted for engaging and abutting the inner race 36 of a main bearing assembly 34 at surface 37, which rotates with (and therefore remains static relative to) a web 28, in order to prevent the main bearing 34 from sliding off of the web 28. As shown, the bearing retaining section 56 does not extend radially beyond the inner race 36. The retaining section 56 does not contact the cage 40 of the main bearing assembly 34. Because the counterweights 52 are adapted for retaining the main bearing assemblies 34, the counterweights 52 may be used in place of at least a portion of the bearing retainers 68 that would otherwise be necessary.

Each counterweight 52 is stepped so that surface 55 of mass section 54 is axially spaced away from the web 28 to which the counterweight 52 is attached and also axially spaced from the cage 40 of the bearing 34 disposed around that web 28. It is axially spaced from surface 60 of that web 28 and surface 58 of retaining section 56 and surface 37 of race 36. The space, which can be called a gap, permits mass section 54 to extend radially beyond the outer most diameter $D_I$ of the inner race 36 of the bearing assembly 34 and overlap cage 40 and roller elements 38 in the radial direction without contacting the cage 40. In that regard, the mass section 54 of the counterweight 52 may define a radial profile having a diameter $D_C$, which may be called a length, that is greater than the outer most diameter $D_I$, which may be called a length, of a radial profile defined by the inner race 36 of the bearing assembly 34. This moves the center of gravity of the counterweight 52 to a greater radial distance from the crankshaft assembly's 10 axis A-A of rotation than would otherwise be possible, thereby increasing the effectiveness of the mass of the counterweights 52 at improving the crankshaft assembly's 10 balance during operation.

The addition of mass to counterweights, such as counterweights 52, increases the effectiveness of the counterweights in decreasing the unbalanced shaking. The increase in effectiveness per unit of increase in mass is only proportional. Furthermore increasing the longitudinal distance of counterweights, such as counterweights 52, away from the axial center of the axis A-A of rotation of the shaft, along the length of the axis A-A, also decreases unbalanced shaking. Again the decrease is only proportional. Notably, however, as the radial distance between the axis A-A of rotation and the center of gravity of counterweights, such as the counterweights 52, is increased, so is the effectiveness of the counterweights in decreasing unbalanced shaking. The increase in effectiveness, per unit of increase in the radial distance, is exponential as compared to only proportional. Thus as the radius increases a certain amount, the effectiveness of the radial increase is exponential compared to the amount of the radial increase. Therefore increasing radial distance is far more effective than increasing mass or longitudinal distance. Because in the present disclosure the center of gravity of the counterweights 52 is located a greater radial distance from the axis A-A of rotation than previous counterweights, a counterweight 52 of the present disclosure having the same mass as the counterweights used in previously-known crankshaft assemblies will produce a greater inertial force in the present invention in order to better counteract the force generated by a corresponding reciprocating piston or plunger 22, as well as the force generated by an eccentric crank pin 30 and the connecting rod 16 coupling them. This of course decreases the unbalanced shaking. The radial increase further means a counterweight 52 having a smaller mass than a counterweight used in a previously-known crankshaft can produce an inertial force that is at least generally equal to the inertial force produced by the counterweight in the previously-known crankshaft. Further yet, because of the larger radial profile in which a counterweight may be located, a counterweight 52 of the present invention may comprise a greater mass as compared to a counterweight used in a previously-known crankshaft, thereby resulting in greater inertial force in order to better counteract the force generated by a corresponding reciprocating piston or plunger 22 and by other eccentric and non-concentrically rotating components. Even an incremental reduction in the unbalanced shaking of the crankshaft assembly 10 results in smoother pump operation and increases bearing and component life.

The crankshaft assembly 10 of the present invention is adapted for slidingly fitting within a tunnel crankcase 14 having a crankshaft support surface (not shown) defining at least one radial envelope for supporting the outer race 42 of a main bearing 35. In order to permit the crankshaft assembly 10 to be slid into the crankcase 14 upon the completion of its assembly, the effective diameter $D_C$ of the counterweight 52 should be no greater than and preferably less than the outer diameter $D_O$ formed by the outer race 42 around its respective web. In the case that the outer races 42 are already held in the crankcase 14, $D_C$ should, be no greater than and preferably less than the outer diameter $D_B$ of the bearing assembly 34. In one embodiment, no part of the counterweight 52 attached to a respective web extends radially beyond the radial profile and envelope defined by the outer race 42 around its respective web. Also in the present example, no counterweight 52 attached to a web extends radially beyond the roller elements 38 of its associated web. Each counterweight 52 extends radially a short enough distance from the respective web to which it is attached to allow insertion of the crankshaft into the radial profile or radial envelope formed by the crankshaft support surface. At and during insertion and fitting the crankshaft into the crankcase 14 the counterweight can be attached to its respective web. The fully assembled crankshaft assembly 10 having bearing assemblies 34 can be inserted into and removed from the crankcase 14, a single non-split crankcase, as one assembly.

In addition to counterweights 52, the crankshaft assembly 10 may also optionally include other counterweights 76 that are not necessarily constructed or positioned for retaining the main bearings 34 on the webs 28 or having an increased radial profile.

From the foregoing, it will be seen that this invention is one well adapted to attain all the ends and objects hereinabove set forth together with other advantages which are obvious and which are inherent to the structure. It will be understood that certain features and sub combinations in addition to those shown and discussed herein are possible. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

I claim:

1. A crankshaft assembly comprising:
    a first crank web having a first outer bearing support surface;
    a second crank web having a second outer bearing support surface;
    a crank pin extending between and directly connecting the first web and the second web;
    a first bearing assembly forming at least a portion of a main bearing, the first bearing assembly disposed around the first outer bearing support surface; and
    a first counterweight carried by said first crank web, said first counterweight including a first bearing retaining section that extends radially beyond said first bearing support surface, said first bearing retaining section retaining said first bearing assembly in an axial direction and said first counterweight including a first mass section that extends radially beyond said first outer bearing support surface and has a first surface which overlaps at least a portion of said first bearing assembly, the first surface being axially spaced from said portion of said first bearing assembly that is overlapped.

2. The crankshaft assembly of claim 1, wherein said first bearing retaining section has a surface adapted for engaging with said first crank web.

3. The crankshaft assembly of claim 1, wherein the first bearing assembly includes an inner race, rolling elements carried in said race, and a cage into which said roller elements are disposed, and wherein said first bearing retaining section does not contact said cage.

4. The crankshaft assembly of claim 3, wherein said first bearing retaining section does not extend radially beyond an outermost diameter of said bearing inner race.

5. The crankshaft assembly of claim 3, wherein said first surface of said first mass section overlaps and extends radially beyond said outermost diameter of said bearing inner race.

6. The crankshaft assembly of claim 3, wherein said crankshaft assembly is adapted for slidingly inserting within a one piece non-split crankcase having a surface defining a radial envelope in which a bearing outer race is disposed when said crankshaft assembly is within said crankcase, and wherein said first mass section of said first counterweight does not extend radially beyond said radial envelope of said surface defining said envelope.

7. The crankshaft assembly of claim 5, wherein said first surface of said first mass section is spaced axially from said bearing cage.

8. The crankshaft assembly of claim 1, further comprising at least one fastener for coupling said first counterweight to said first crank web.

9. The crankshaft assembly of claim 1, further comprising a first bearing retainer coupled to said first web and operable to retain the first bearing assembly in an axial direction.

10. The crankshaft assembly of claim 9, wherein the first bearing retainer is positioned on a first axial side of the first bearing assembly to inhibit axial movement in a first axial direction and the first bearing retaining section is positioned on a second axial side of the first bearing assembly to inhibit axial movement in a second axial direction opposite the first axial direction.

11. The crankshaft assembly of claim 1, further comprising a second bearing assembly forming at least a portion of the main bearing, the second bearing assembly disposed around the second outer bearing support surface.

12. The crankshaft assembly of claim 11, wherein each of the first bearing assembly and the second bearing assembly defines an outside diameter, the outside diameter being the largest outside diameter of the crankshaft assembly.

13. The crankshaft assembly of claim 11, further comprising a second counterweight carried by said second crank web.

14. The crankshaft assembly of claim 13, wherein the second counterweight includes a second bearing retaining section that extends radially beyond the second bearing support surface, the first bearing retaining section retaining the second bearing assembly in an axial direction.

15. The crankshaft assembly of claim 14, wherein the first counterweight includes a second mass section that extends radially beyond said second outer bearing support surface and has a second surface which overlaps at least a portion of the second bearing assembly, the second surface being axially spaced from the portion of the second bearing assembly that is overlapped.

16. The crankshaft assembly of claim 11, further comprising a third crank web having a third outer bearing support surface, a second crank pin extending between and interconnecting the second crank web and the third crank web and a third bearing assembly forming at least a portion of the main bearing, the third bearing assembly disposed around the third outer bearing support surface.

17. The crankshaft assembly of claim 16, further comprising a second counterweight carried by said second crank web and a third counterweight carried by the third crank web.

18. The crankshaft assembly of claim 17, wherein the second counterweight includes a second bearing retaining section that extends radially beyond said second bearing support surface to retain the second bearing assembly in an axial direction and a third bearing retaining section that extends radially beyond the third bearing support surface to retain the third bearing assembly in an axial direction.

19. A crankshaft assembly comprising:
a plurality of axially-spaced crank webs, each said web having an outer bearing support surface;
at least one crank pin, said crank pin extending between and interconnecting two webs of said plurality;
at least one bearing assembly forming at least a portion of a main bearing, said bearing assembly disposed around the outer bearing support surface of one of said webs interconnected by said pin; and
at least one counterweight carried by said web having said at least one bearing assembly, said counterweight including a bearing retaining section that extends radially beyond said bearing support surface of said web having said at least one bearing assembly, said retaining section retaining said bearing assembly in an axial direction and said counterweight including a mass section that extends radially beyond said support surface having said bearing assembly and said mass section having a surface which overlaps at least a portion of said bearing assembly and being axially spaced from said portion of said bearing assembly that is overlapped, wherein said at least one bearing assembly includes an inner race, rolling elements carried in said race, and a cage into which said roller elements are disposed, and wherein said bearing retaining section of said counterweight does not contact said cage, and wherein said mass section of said counterweight defines a radial profile of said crankshaft assembly that is greater in diameter than a radial profile defined by said bearing inner race.

20. A crankshaft assembly comprising:
a plurality of axially-spaced crank webs, each said web having an outer cylindrical bearing support surface;
at least one crank pin, said crank pin extending between and interconnecting two webs of said plurality;
at least one bearing assembly forming at least a portion of a main bearing, said bearing assembly disposed around one of said webs interconnected by said crank pin, said bearing assembly including an inner race, rolling elements and a cage in which said rolling elements are disposed;
at least one counterweight secured to said web having said at least one bearing assembly, said counterweight including:
a bearing retaining section that retains said bearing on said web in an axial direction, said bearing retaining section overlapping said bearing race without extending radially beyond said bearing inner race; and
a mass section that is spaced axially from said cage, overlapping said cage, wherein said mass section extends radially beyond said bearing inner race, wherein said crankshaft assembly is adapted for slidingly inserting in a one piece non-split crankcase having a surface defining a radial envelope in which an outer race for said main bearing is disposed when said crankshaft assembly is disposed within said crankcase, and wherein said mass section of said counterweight does not extend radially beyond said radial envelope defined by said surface defining said radial envelope.

* * * * *